(12) United States Patent
Kersting (10) Patent No.: US 10,011,511 B2
(45) Date of Patent: Jul. 3, 2018

(54) APPARATUS AND METHOD FOR PROCESSING MOLTEN GLASS

(71) Applicant: Corning Incorporated, Corning, NY (US)

(72) Inventor: John Jerry Kersting, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 186 days.

(21) Appl. No.: 14/912,412

(22) PCT Filed: Aug. 19, 2014

(86) PCT No.: PCT/US2014/051638
§ 371 (c)(1),
(2) Date: Feb. 17, 2016

(87) PCT Pub. No.: WO2015/026789
PCT Pub. Date: Feb. 26, 2015

(65) Prior Publication Data
US 2016/0185643 A1    Jun. 30, 2016

Related U.S. Application Data

(60) Provisional application No. 61/868,835, filed on Aug. 22, 2013.

(51) Int. Cl.
*C03B 17/06* (2006.01)
*C03B 7/02* (2006.01)
(Continued)

(52) U.S. Cl.
CPC ............... *C03B 7/02* (2013.01); *C03B 7/07* (2013.01); *C03B 17/02* (2013.01); *C03B 17/064* (2013.01)

(58) Field of Classification Search
CPC ........ C03B 17/064; C03B 17/14; C03B 17/16
See application file for complete search history.

(56) References Cited

U.S. PATENT DOCUMENTS 1,888,039 A   11/1932  Huff
4,204,027 A    5/1980  Simon
(Continued)

FOREIGN PATENT DOCUMENTS

CN    201704191 U    1/2011
CN    202576206 U   12/2012
(Continued)

OTHER PUBLICATIONS

EP14838266 Supplementay Search Report dated Mar. 3, 2017, European Patent Office.
(Continued)

*Primary Examiner* — Cynthia Szewczyk
(74) *Attorney, Agent, or Firm* — Kevin M. Able (57) ABSTRACT

A glass forming apparatus for processing molten glass is disclosed comprising a delivery vessel for delivery molten glass to a forming body through a delivery conduit, the delivery conduit comprising a first portion have a circular cross-sectional shape, a second portion comprising a circular cross-sectional shape and a third portion comprising a non-circular cross-sectional shape. The delivery conduit further comprises a first transition portion coupling the second portion to the third portion, and a second transition portion coupling the third portion to an inlet of a trough in a forming body. Neither an inside bottom surface of the third portion, nor an inside bottom surface of the second transition portion, is lower than a bottom surface of the forming body trough. A method of processing molten glass is also described.

14 Claims, 5 Drawing Sheets

(51) Int. Cl.
*C03B 7/07* (2006.01)
*C03B 17/02* (2006.01)

(56) References Cited

U.S. PATENT DOCUMENTS

| | | | |
|---|---|---|---|
| 4,214,886 | A | 7/1980 | Shay et al. |
| 4,344,785 | A | 8/1982 | Jensen |
| 5,851,258 | A | 12/1998 | Ando et al. |
| 7,150,165 | B2 | 12/2006 | Pitbladdo |
| 7,490,487 | B2 | 2/2009 | Singer et al. |
| 7,818,980 | B2 | 10/2010 | Burdette et al. |
| 8,001,856 | B2 | 8/2011 | Knevels et al. |
| 8,065,892 | B2 | 11/2011 | Kano |
| 8,196,434 | B2 | 6/2012 | Pitbladdo |
| 8,408,029 | B2 | 4/2013 | De Angelis et al. |
| 2004/0067369 | A1 | 4/2004 | Ott et al. |
| 2004/0134235 | A1 | 7/2004 | Pitbladdo |
| 2005/0076677 | A1 | 4/2005 | Pitbladdo |
| 2005/0132823 | A1 | 6/2005 | Knevels et al. |
| 2005/0160769 | A1 | 7/2005 | Sakai et al. |
| 2005/0229637 | A1 | 10/2005 | Hamashima et al. |
| 2005/0268659 | A1 | 12/2005 | Rhoads |
| 2006/0096322 | A1 | 5/2006 | Singer et al. |
| 2007/0068197 | A1* | 3/2007 | Pitbladdo ............ C03B 17/064 65/90 |
| 2007/0084247 | A1 | 4/2007 | Pitbladdo |
| 2007/0190340 | A1* | 8/2007 | Coppola ............... B32B 17/06 428/432 |
| 2008/0034798 | A1 | 2/2008 | Bergman et al. |
| 2008/0148779 | A1 | 6/2008 | Takeshita et al. |
| 2009/0013725 | A1 | 1/2009 | Kano |
| 2010/0269545 | A1* | 10/2010 | Boratav ................ C03B 7/06 65/128 |
| 2011/0277504 | A1 | 11/2011 | Pitbladdo |
| 2012/0103019 | A1* | 5/2012 | Milillo ................. C03B 7/02 65/53 |
| 2015/0158753 | A1 | 6/2015 | Milillo et al. |

FOREIGN PATENT DOCUMENTS

| | | |
|---|---|---|
| JP | 2000128548 A | 5/2000 |
| JP | 2007284299 A | 11/2007 |
| WO | 2007020773 A1 | 2/2007 |
| WO | 2009011792 A1 | 1/2009 |

OTHER PUBLICATIONS

Korean Intellectual Property Office; International Preliminary Report on Patentability for International Application No. PCT/US2014/051638; dated Mar. 3, 2016; pp. 1-8.

Korean Intellectual Property Office; International Search Report and Written Opinion; dated Nov. 25, 2014; pp. 1-10.

English Translation of TW103128845 Search Report Dated Apr. 16, 2018, Taiwan Patent Office, 2 pages.

* cited by examiner

APPARATUS AND METHOD FOR PROCESSING MOLTEN GLASS

PRIORITY

This application claims the benefit of priority under 35 U.S.C. § 119 of U.S. Provisional Application Ser. No. 61/868,835 filed on Aug. 22, 2013, the content of which is relied upon and incorporated herein by reference in its entirety.

BACKGROUND

Field

The present disclosure relates generally to an apparatus and method for the processing of molten glass, and more particularly an apparatus and method for conveying molten glass from a delivery vessel to a forming body.

Technical Background

The fusion glass making process is known for producing high quality glass sheets of extraordinary thinness without grinding or polishing to further thin the as-drawn glass. The process in its simplest form comprises flowing molten glass over two opposing and converging sides of a forming body, wherein the separate flows of glass meet at a bottom edge of the forming body to form a glass ribbon. The glass ribbon cools to an elastic state, after which the ribbon can be cut into individual glass sheets.

Recently, strengthened glass has become popular as cover glass to protect electronic devices such as cell phones and tablet computers. Such glass is typically chemically strengthened by ion-exchanging the surfaces of the glass. However, ion-exchanging does not readily lend itself to an in-line process, and therefore becomes an expensive batch process requiring multiple steps. Moreover, the chemicals used in the ion exchange process must be properly handled to comply with environmental constraints, further adding to the expense. Applications that would otherwise benefit from strengthened glass, such as glass cover plates for household appliances, e.g. refrigerators, may not warrant the expense of ion-exchanged glass. Thus, a process for producing low-cost strengthened glass in thin sheets and in a continuous process addresses a beneficial need. To that end, in-line lamination processes have been developed wherein multiple flows of glass are combined to form a laminated glass ribbon. Preferably, the laminated glass ribbon comprises two different glasses with two different coefficients of thermal expansion such that when the glasses cool, the outer layer of the glass ribbon is in compression and subsequent glass sheets cut from the ribbon are capable of resisting damage better than a glass sheet originating with a single-layer ribbon.

SUMMARY

To meet the space requirements for a glass forming apparatus comprising one or more forming bodies a delivery vessel that delivers molten glass to a trough of the one or more forming bodies may need to be located a significant distance from the forming body. This can results in a delivery conduit that may impede the flow of molten glass to the respective forming body, placing restrictions on the maximum flow rate of molten glass through the conduit and hence to the forming body. On the other hand, simply increasing the diameter of the conduit to reduce the flow impedance can create a sump region within the conduit, where the conduit bottom is lower than the trough of the forming body, creating the potential for molten glass to cease flowing and become stagnant. Accordingly, embodiments disclosed herein described composite delivery conduits comprising non-circular cross sections that enable an enlarged cross sectional flow area but wherein an inside bottom surface of the delivery conduit does not extend below a bottom surface of the forming body conduit and an upper inside surface of the delivery conduit does not extend above a top of the trough inlet.

In one aspect an apparatus for forming molten glass is disclosed comprising a forming body comprising a trough positioned in a top of the forming body, a delivery vessel comprising a delivery vessel outlet conduit, the delivery vessel configured to supply molten glass to the forming body trough through a delivery conduit configured to deliver the flow of molten glass to the forming body trough, the delivery conduit comprising a first portion having a straight longitudinal axis and a circular cross section, wherein at least a portion of the delivery vessel outlet conduit extends within but does not contact at least a length of the first portion, there being an annular gap separating the at least a portion of the delivery vessel outlet conduit from the first portion of the delivery conduit. The delivery conduit may further comprise a second portion configured to direct the flow of molten glass from a first direction to a second direction different from the first direction. The delivery conduit may still further comprise a third portion having a straight longitudinal axis and an inside bottom surface, and wherein a cross sectional shape of the third portion is non-circular. Additionally, the delivery conduit can include a first transition portion that connects the second portion to the third portion, a second transition portion that couples the third portion to the forming body trough, the second transition portion having an inside bottom surface, and wherein the bottom surfaces of the third portion and the second transition portion are no lower than a bottom surface of the trough.

In another aspect, an apparatus for forming molten glass is described comprising: a first forming body, a first delivery vessel configured to supply molten glass to the first forming body through a first precious metal delivery conduit, a second forming body positioned vertically below the first forming body and comprising a trough, a second delivery vessel configured to supply molten glass to the second forming body, the second delivery vessel comprising an outlet conduit extending from a bottom thereof, a second precious metal conduit configured to receive a flow of molten glass from the second delivery vessel outlet conduit and deliver the flow of molten glass to the second forming body trough. The second precious metal conduit may comprise a first portion having a straight longitudinal axis and a circular cross section, wherein at least a portion of the outlet conduit extends within but does not contact at least a length of the first portion, there being an annular gap separating the at least a portion of the outlet conduit from the first portion of the second precious metal conduit. The second precious metal conduit may further comprise a second portion configured to direct the flow of molten glass from a first direction to a second direction. The second precious metal conduit may still further comprise a third portion having a straight longitudinal axis and an inside bottom surface, and wherein a cross sectional shape of the third portion is non-circular. Additionally, the second precious metal conduit can include a first transition portion that connects the second portion to the third portion, a second transition portion that couples the third portion to the second forming body trough, the second transition portion having an inside bottom surface, and wherein a bottom surfaces of the third portion and the second transition portions are no lower than a bottom surface of the trough.

In still another aspect, a method is disclosed comprising flowing a first molten glass to a first forming body from a first delivery vessel through a first delivery vessel outlet conduit, flowing a second molten glass from a second delivery vessel to a trough of a second forming body from a second delivery vessel through a second delivery vessel outlet conduit, the first molten glass free-flowing from the first forming body and intersecting the second molten glass, the first molten glass forming a cladding layer on the second molten glass, and drawing the first molten glass and the second molten glass from the second forming body as a laminated glass ribbon. A composition of the second molten glass may different than the first molten glass. Flowing the second molten glass from the second delivery vessel to the second forming body can comprise flowing the second molten glass through a delivery conduit un-coupled from the second delivery vessel outlet conduit, the second delivery conduit comprising: a first portion having a straight longitudinal axis and a circular cross section, wherein at least a portion of the delivery vessel outlet conduit extends within but does not contact at least a length of the first portion, there being an annular gap separating the at least a portion of the delivery vessel outlet conduit from the first portion of the delivery conduit.

The second delivery conduit may further comprise a second portion configured to direct the flow of the second molten glass from a first direction to a second direction different from the first direction.

The second delivery conduit may further comprise a third portion having a straight longitudinal axis and an inside bottom surface, and wherein a cross sectional shape of the third portion is non-circular.

The second delivery conduit may further comprise a first transition portion that connects the second portion to the third portion, a second transition portion that couples the third portion to the second forming body trough, the second transition portion having an inside bottom surface, and wherein the bottom surfaces of the third portion and the second transition portion are no lower than a bottom surface of the trough.

The first forming body may produce multiple flows of the first molten glass that separately intersect the second molten glass.

Additional features and advantages of the embodiments disclosed herein will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are intended to provide an overview or framework for understanding the nature and character of embodiments disclosed herein. The accompanying drawings are included to provide a further understanding of the embodiments, and are incorporated into and constitute a part of this specification. The drawings, together with the description, serve to explain the principles and operations of the disclosed embodiments.

DETAILED DESCRIPTION

Reference will now be made in detail to embodiments disclosed herein, examples of which are illustrated in the accompanying drawings. Whenever possible, the same reference numerals will be used throughout the drawings to refer to the same or like parts.

Figure 1:
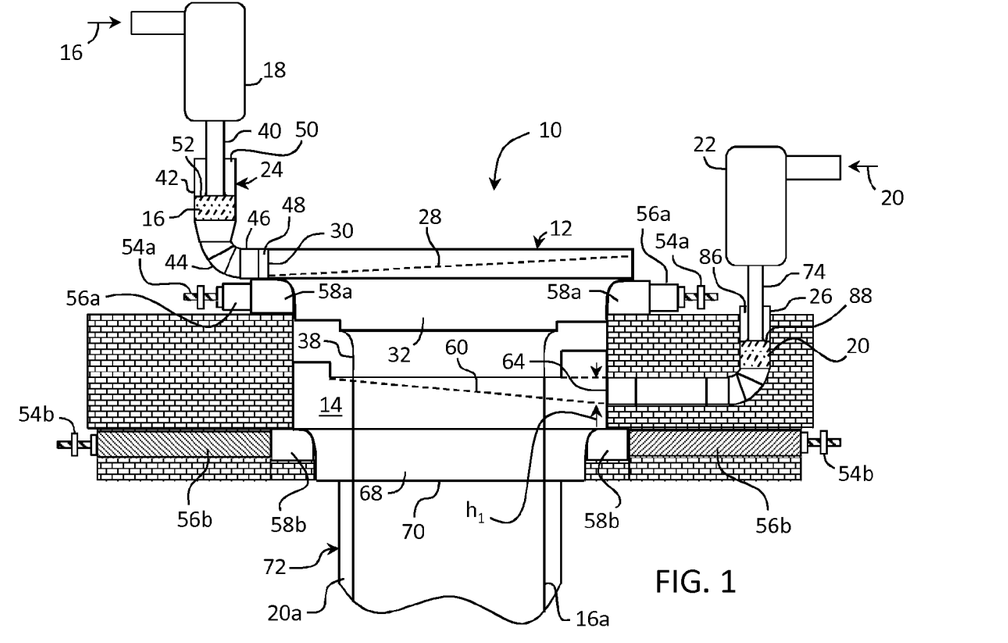
FIG. 1 is a side view of an apparatus view of an exemplary glass forming apparatus in accordance with an embodiment of the present disclosure.

FIG. 1 illustrates an example glass forming apparatus comprising two forming bodies, wherein one forming body is positioned vertically below the other forming body. Each forming body is supplied with molten glass from a separate delivery vessel and includes separate devices for supporting and longitudinally compressing the respective forming body to prevent sagging when operating for extended periods at high temperature. Because this equipment is located at both ends of each forming body, and the vertically aligned placement of the forming bodies consumes valuable space around each forming body, the delivery vessel supplying molten glass to the lower forming body is displaced farther from the lower forming body than the delivery vessel supplying molten glass to the upper forming body is from the upper forming body. Consequently, the delivery conduit conveying molten glass from the respective delivery vessel to the lower forming body must be longer than the conduit conveying glass to the upper forming body from its respective delivery vessel. The longer conduit increases the fluid head loss for the longer conduit, which may impede the consistent flow of glass for a given flow rate. Conventionally, delivery conduits providing molten glass to forming bodies of the type described herein have employed a circular cross section, as a circular cross section provides the lowest head loss, and the solution would be to increase the cross sectional area of the conduit by increasing the diameter of the conduit. However, the inlet to the forming body is of a predetermined size and increasing the diameter of a circular conduit may result in an upper portion of the conduit providing an undesirable free surface to the glass flow. On the other hand, an increased circular cross section may further result in a portion of the conduit extending below the bottom of the forming body inlet, thereby forming a sump that 1) may serve as a source of stagnant, non-homogeneous glass composition, and 2) be difficult to drain. To overcome these and other difficulties, an oblong conduit as described herein is provided between the lower forming body and its respective delivery vessel. While an oblong conduit typically has a higher head loss for a given glass flow rate than a circular cross section conduit, the ability to accommodate the glass flow without forming a free glass surface or a sump is an acceptable tradeoff. As used herein, oblong refers to a cross sectional shape (the shape of a conduit or similar vessel or object in cross section orthogonal to a longitudinal dimension of the conduit or similar vessel or object) wherein a dimension in one direction is greater than a dimension is an orthogonal direction. Shapes included as oblong comprise without limitation a rectangle, an ellipse, an oval, or a race-track shape wherein two semicircular end portions are joined by two straight sections.

In accordance with the embodiment of FIGS. 1-3, a glass forming apparatus 10 is shown comprising a first forming body 12 and a second forming body 14 positioned directly, vertically below the first forming body. First forming body 12 is supplied with molten glass 16 from first delivery vessel 18, while second forming body 14 is supplied with molten glass 20 from a second delivery vessel 22. First delivery conduit 24 is configured to convey molten glass 16 from first delivery vessel 18 to first forming body 12, while second delivery conduit 26 is configured to convey molten glass 20 from second delivery vessel 22 to second forming body 14. A composition of molten glass 16 may be different from a composition of molten glass 20. For example, a coefficient of thermal expansion of a glass resulting from molten glass 16 can be less than the coefficient of thermal expansion of a glass resulting from molten glass 20.

First forming body 12 comprises a first trough 28 configured to receive molten glass 16 from first delivery conduit 24 that is coupled to inlet 30 of first forming body 12. First forming body 12 further comprises forming surfaces 32 opposing each other on opposite sides of the forming body, and may further include a recessed bottom surface 34 opposite first trough 28. In some embodiments, forming surfaces 32 are parallel to each other but are not necessarily so. First forming body 12 receives molten glass 16 into first trough 28, wherein the molten glass overflows walls 36 and flows downward over forming surfaces 32. The molten glass leaves first forming body 12 as two free-flowing, separate streams 38a and 38b of molten glass from two respective bottom edges 39a and 39b of first forming body 12. The first forming body may be formed of a refractory ceramic material, such as alumina or zirconia.

First delivery vessel 18 comprises an outlet conduit 40 extending from a bottom thereof. First delivery vessel 18 and outlet conduit 40 can be metallic, and may be formed from a high temperature precious metal such as a platinum group metal (i.e. platinum, rhodium, iridium, ruthenium, palladium or osmium), or an alloy thereof. For example first delivery vessel 18 and outlet conduit 40 may be formed from platinum or a platinum-rhodium alloy. Suitable platinum-rhodium alloys may have a rhodium concentration from about 10% by weight rhodium to about 30% by weight rhodium.

First delivery conduit 24 is configured to receive the flow of molten glass 16 from first delivery vessel outlet conduit 40 and deliver the flow of molten glass to first forming body trough 28 via first forming body inlet 30. First delivery conduit 24 can be metallic, and, like first delivery vessel 18 and outlet conduit 40, may be formed from a high temperature metal, such as a precious metal, such as a platinum group metal (i.e. platinum, rhodium, iridium, ruthenium, palladium or osmium), or an alloy thereof. For example, first delivery conduit 24 may be platinum or a platinum-rhodium alloy. Suitable platinum-rhodium alloys may have a rhodium concentration from about 10% by weight rhodium to about 30% by weight rhodium.

First delivery conduit 24 comprises a first cylindrical portion 42, a second portion 44 that redirects the flow of molten glass 16 from a first direction to a second direction different than the first direction, and a third portion 46. For example, second portion 44 may redirect the flow of molten glass 16 from a vertical direction to a horizontal direction. Third portion 46 can have a circular cross sectional shape. That is, third portion 24 can be a cylinder. First delivery conduit 24 may further comprise a first transition portion 48 that couples third portion 46 to the generally rectangular shaped inlet of first trough 28. Third portion 46 extends between second portion 44 and first transition portion 48. At least a portion of first delivery vessel outlet conduit 40 extends into and within first cylindrical portion 42 and may be concentric therewith, but does not contact first portion 42 and is therefore uncoupled from first delivery vessel outlet conduit 40. Accordingly, an annular gap 50 is formed between outlet conduit 40 and first portion 42 that exposes a surface of the molten glass 16 within first portion 42 to an atmosphere within the annular gap. That is, the molten glass 16 comprises a free surface 52 within annular gap 50.

It should be understood that in a manufacturing environment a myriad of other equipment may also be involved in the production of high-quality commercial glass products and positioned in the vicinity of first forming body 12, including various metal and refractory support members for supporting the forming body and associated piping and conduits, cooling equipment, heating equipment and insulating members, to name a few. For example, force devices 54a for applying longitudinal compression forces against the ends of first forming body 12 may be employed to prevent sagging of the forming body when operated at high temperature for long periods of time. Such force devices are illustrated in FIG. 1 as jack screws, but could take other forms, such as pneumatic or hydraulic pistons (rams). In the embodiment of FIG. 1, force devices 54a apply a force through transfer blocks 56a against bearing blocks 58a in contact with the ends of first forming body 12. The forces applying by force devices 54a are transmitted via the bearing blocks to the ends of the forming body. However, other arrangements for applying compression forces to the ends of the forming body may also be used.

Figure 2:
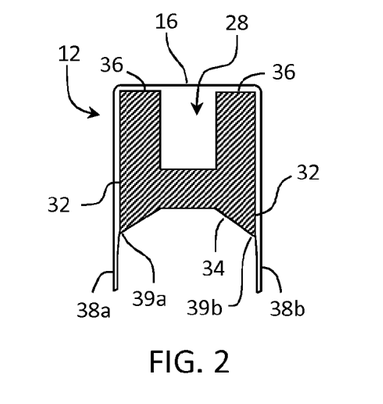
FIG. 2 is a cross sectional end view of a first forming body of the forming apparatus of FIG. 1.
Figure 3:
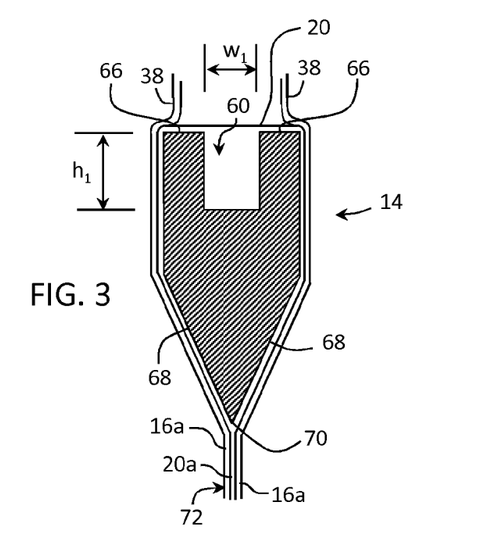
FIG. 3 is a cross sectional end view of a second forming body of the forming apparatus of FIG. 1.
Figure 4:
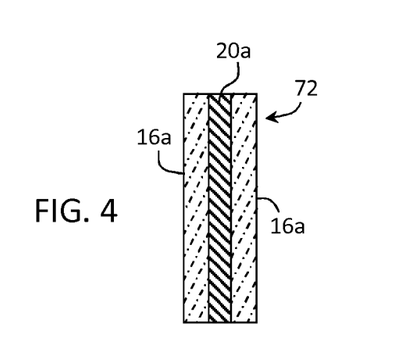
FIG. 4 is a cross sectional edge view of a portion of a glass ribbon formed by the forming apparatus of FIG. 1.

As best seen in FIGS. 1-3, second forming body 14 is positioned vertically below first forming body 12 and comprises a second trough 60 configured to receive molten glass 20 from second delivery conduit 26 that is coupled to inlet 64 of the second forming body. Second forming body 14 may be formed of a refractory ceramic material, such as alumina or zirconia. The molten glass 20 delivered from the second delivery vessel overflows the walls 66 of the second trough and flows in separate streams over converging forming surfaces 68 that meet where the converging forming surfaces join at the bottom of the forming body, i.e. root 70. It can be seen from the cross sectional view of FIG. 3 that the separate streams 38a and 38b of molten glass 16 flowing from first forming body 12 intercept and overlay the flow of molten glass 20 from second forming body 14. Thus, the flow of molten glass from the root 70 of second forming body 14 is a glass ribbon 72 comprising an inner layer 20a of molten glass 20 and at least one outer layer 16a of molten glass 16. The inner layer 20a of molten glass 20, also termed the core glass, may be clad with two outer layers 16a of the molten glass 16, also termed the cladding glass, with one layer of cladding glass on each major surface of the core glass, thereby forming glass ribbon 72. The cladding glass composition may differ from the composition of the core glass such that when the molten glass cools to an elastic state, a compressive stress is formed at the outer surfaces of the resultant glass ribbon 72, improving the toughness of the resultant glass ribbon. An edge view of a portion of a glass ribbon 72 formed by the foregoing process is shown in FIG. 4 in cross section, illustrating a laminated body having an inner layer 20a of core glass clad with outer layers 16a of cladding glass.

As with first forming body 12, force devices may be included to apply a longitudinal force against the ends of second forming body 14 to prevent sagging of the forming body from extended exposure to high temperature. As shown in FIG. 1, force devices 54b are used to apply a longitudinal compressive force against the ends of second forming body 14 via transfer blocks 56b and bearing blocks 58b.

Second delivery vessel 22 can be formed from a high temperature precious metal such as a platinum group metal (i.e. platinum, rhodium, iridium, ruthenium, palladium or osmium), or an alloy thereof. For example, second delivery vessel 22 may be platinum or a platinum-rhodium alloy. Suitable platinum-rhodium alloys may have a rhodium concentration from about 10% by weight rhodium to about 30% by weight rhodium. Similar to first delivery vessel 18, second delivery vessel 22 comprises an outlet conduit 74 extending from a bottom thereof. Second delivery conduit 26 is configured to receive the flow of molten glass 20 from second delivery vessel outlet conduit 74 and deliver the flow of molten glass to second forming body trough 60 via second delivery conduit 26 and second forming body inlet 64.

Figure 5:
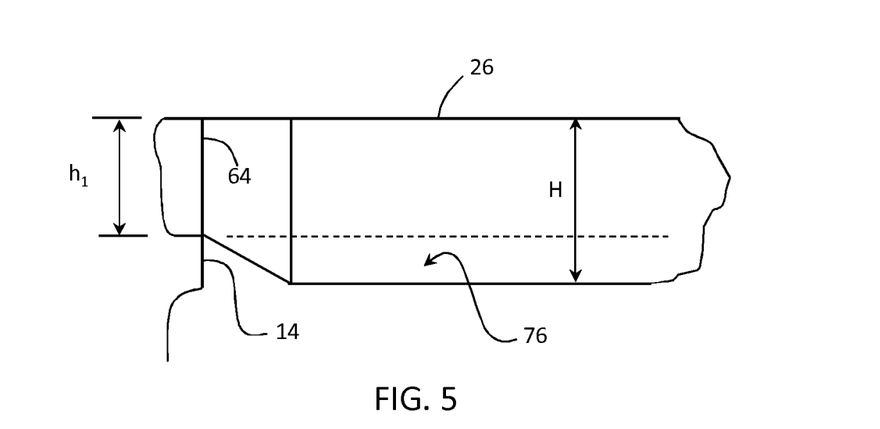
FIG. 5 is a side view of a delivery conduit wherein an inside bottom surface of the delivery conduit extends below an inside bottom surface of the forming body trough.

It should be recognized that the ancillary equipment associated with first forming body 12 and located in close proximity to first forming body 12, such as force devices 54a, complicate placement of second delivery vessel 22 and second delivery conduit 26. Thus, it may be necessary to locate second delivery vessel 22 a considerably farther distance from second forming body 14 than the distance first delivery vessel 18 is located from first forming body 12. As a result, the length of second delivery conduit 26 may be significantly longer than first delivery conduit 24. The length of second delivery conduit 26 may impose flow restrictions on the delivery of molten glass 20 to second forming body 14, most notably an impedance to flow (head loss) imposed on molten glass 20 by the inner surfaces of the second delivery conduit. As the length of second delivery conduit 26 increases, the impedance to flow also increases. It is known that a cylindrical conduit, having the least amount of inside surface area compared to other geometric shapes, imposes the least head loss to a flowing fluid for a given flow rate. However, to meet a desired flow (flow rate) a diameter of a cylindrical delivery conduit may exceed the height $h_1$ of second trough 60. This can be more easily visualized with the aid of FIG. 5, wherein a height H of the second delivery conduit is greater than the height $h_1$ of the second trough. As a result, a low region of second delivery conduit 26, e.g. sump 76, may be formed, where a bottom floor of the sump region extends below the bottom floor of the second trough, and where glass may collect and stagnate. Similarly, if the conduit is raised upward, the top of second delivery conduit 26 may be above the top of the second trough (above walls 66), possibly leading to the formation of a free glass surface within the delivery conduit. Neither condition is desirable. Accordingly, second delivery conduit 26 is formed with at least a portion of the delivery conduit having non-circular cross sectional shape, and which is described more fully below.

Figure 6:
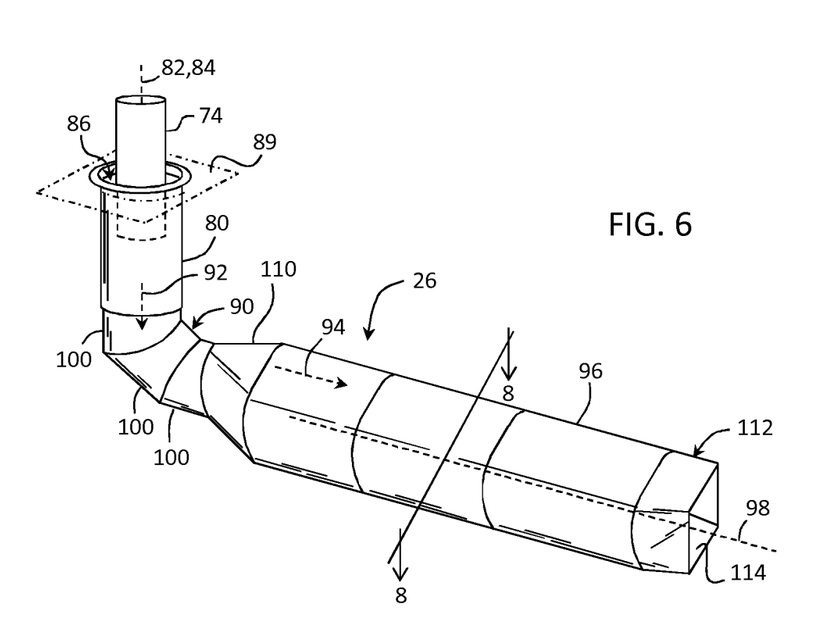
FIG. 6 is a perspective view of an exemplary delivery conduit comprising a non-circular cross section.

As shown in FIG. 6, second delivery conduit 26 comprises a first portion 80 having a straight longitudinal axis 82 and a circular cross section, wherein at least a portion of the second delivery vessel outlet conduit 74 extends into and within at least a length of first portion 80 but does not contact first portion 80. Second delivery conduit 26 is metallic, and may be formed from a high temperature precious metal such as a platinum group metal (i.e. platinum, rhodium, iridium, ruthenium, palladium or osmium), or an alloy thereof. For example second delivery conduit 26 may be platinum or a platinum-rhodium alloy. Suitable platinum-rhodium alloys may have a rhodium concentration from about 10% by weight rhodium to about 30% by weight rhodium.

Figures 7, 8:
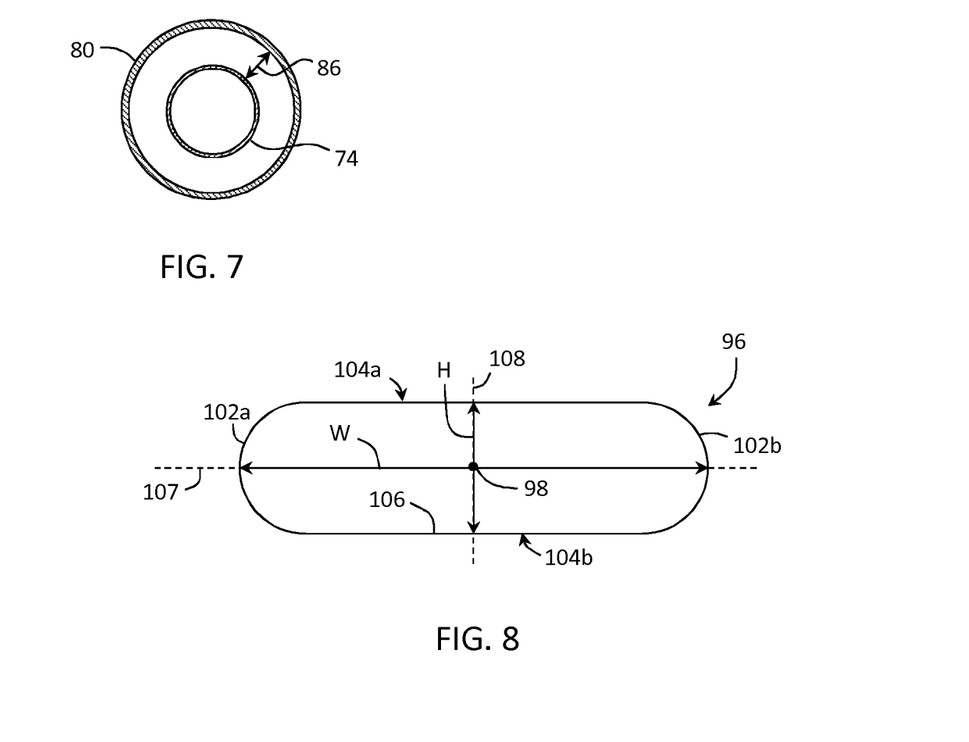
FIG. 7 is a cross sectional view of the delivery conduit of FIG. 6 taken where at least a portion of an outlet conduit from a delivery vessel is inserted into a first portion of the delivery conduit, and illustrates the gap formed by the concentric placement of the two conduits.
FIG. 8 is an cross sectional view of a portion of the delivery conduit of FIG. 6.

Second delivery vessel outlet conduit 74 comprises a longitudinal axis 84 parallel to and co-located with longitudinal axis 82, such that second delivery vessel outlet conduit 74 is concentric with but does not contact first portion 80 of second delivery conduit 26, and is therefore uncoupled therefrom. An annular gap 86 separates the at least a portion of the second delivery vessel outlet conduit 74 from first portion 80 of the second delivery conduit 26, and a surface of molten glass 20 within first portion 80 is exposed to an atmosphere in the annular gap, thereby forming free glass surface 88. A width of annular gap 86 can be, for example, in a range from about 35 mm to about 60 mm. FIG. 7 illustrates a cross section of both first portion 80 and second outlet conduit 74 wherein second outlet conduit 74 is positioned within and concentric to first portion 80, as intersected by plane 89, and shows annular gap 86.

Figure 9:
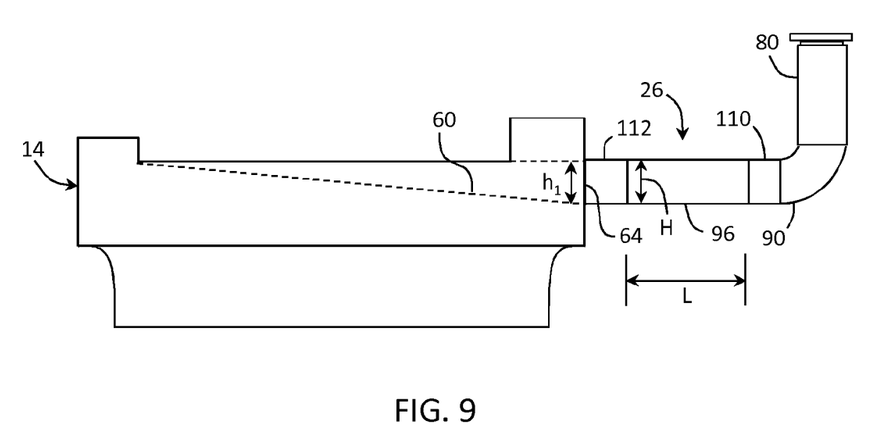
FIG. 9 is a side elevational view of the second forming body of FIG. 1 showing the placement of the delivery conduit relative to the inlet of the forming body trough.

Second delivery conduit 26 further comprises a second portion 90 configured to receive the flow of molten glass from first portion 80 and redirect the flow of molten glass 20 from a first direction 92 to a second direction 94, and a third portion 96 having a straight longitudinal axis 98. Second portion 90 may, for example, redirect the flow of molten glass 20 from a substantially vertical downward flow to a substantially horizontal flow. Second portion 90 may, in some embodiments, be formed from a series of cylindrical sections 100 as shown in FIG. 6. In other embodiments second portion 90 may comprise a curved elbow, as shown in FIG. 9. In either case, second portion 90 comprises a circular cross sectional shape.

As seen in FIGS. 6 and 8, third portion 96, having a non-circular cross section, comprises curved side walls 102a and 102b, and may further include straight (substantially planar) top and bottom walls 104a and 104b, respectively. Bottom wall 104b comprises an inside bottom surface 106. Accordingly, a cross sectional shape of third portion 96 is non-circular, having a maximum inside width W between the mid-points of the side walls (in a cross sectional view) and a maximum inside height H between the mid-points of the substantially planar top and bottom walls that is shorter than the inside width W. As shown in FIG. 8, the maximum inside width W corresponds with and lies on major axis 107, and the maximum inside height H corresponds with and lies on minor axis 108. To ensure that no sump is formed, or that the inside top surface of the third portion does not extend above second trough 60, height H is equal to or less than the height $h_1$ of second trough 60.

The cross sectional shape of the third portion can be an oval, ellipse, polygon, or any cross section in which the width is greater than the height. In the example of FIG. 8, a "racetrack" cross sectional shape is shown having, in cross section, two spaced apart straight (planar), substantially parallel walls corresponding to the top and bottom walls, connected by curved walls, corresponding to the side walls. The illustrated shape has an advantage of structural rigidity, and the rounded corners eliminate the accumulation of stagnant glass pockets. The width, height and length of the third portion can be selected, for example, to have a head loss of no more than 0.08 cm of molten glass per cm of length of third portion 96 for a molten glass having a density of 2.305 g/cc and a viscosity of about 34,585 Poise and at a flow rate equal to or less than 100 kg/hour. Head loss can be calculated by the equation:

$$H_1 = (F*(7926*\rho*2))*(\sigma)*L/D^4) \qquad (1)$$

where F is the flow rate of the molten glass, $\rho$ is the density of the molten glass, $\sigma$ is the viscosity of the molten glass L is the length of the section of conduit and D is the hydraulic diameter of the section of conduit, wherein D is calculated as $D \cong 4A/P$ where A is the cross sectional area of the conduit and P is the length of the perimeter contacted by the molten glass. It should be noted that during extended production, the top wall of the delivery conduit can sag due to the prolonged exposure to high temperature. Thus, the actual shape of the conduit can deviate from the ideal shape (e.g. the shape as formed, before operation with molten glass).

Second delivery conduit 26 further comprises a first transition portion 110 that connects second portion 90 to third portion 96, and a second transition portion 112 that couples third portion 96 to second forming body inlet 64. Second transition portion 112 includes an inside bottom surface 114. First transition portion 110 is configured to mate the circular cross sectional shape of second portion 90 to the non-circular cross sectional shape of third portion 96. First transition portion 110 may, for example, be welded to second portion 90 and third portion 96.

Second transition portion 112 is configured to mate the non-circular cross sectional shape of third portion 96 to the rectangular cross sectional shape of inlet 64 (e.g. trough 60). A line extending along the inside bottom surface 106 of third portion 96 and inside bottom surface 114 of second transition portion 112 may be a straight line, but in any case, the bottom surfaces of third portion 96 and second transition portion 112 are no lower than a bottom surface of trough 60 so that no sump is formed.

Figure 10:
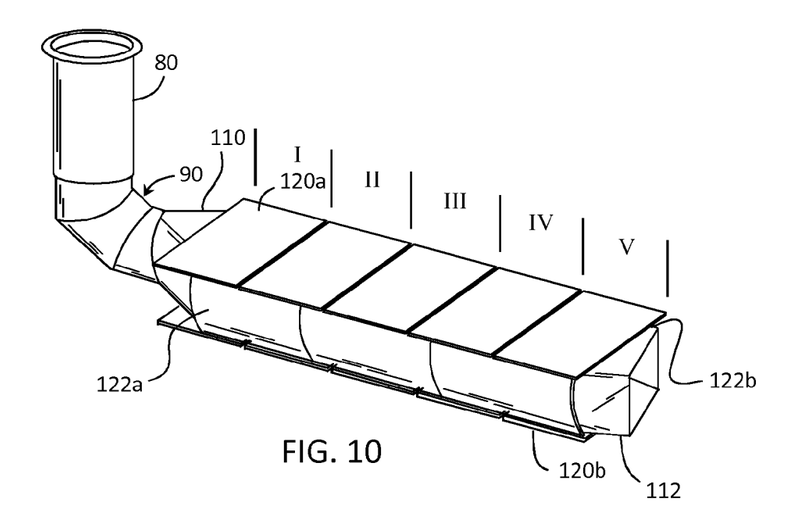
FIG. 10 is a perspective view of the delivery conduit of FIG. 6 showing heating plates arranged adjacent to the delivery conduit in heating zones.
Figure 11:
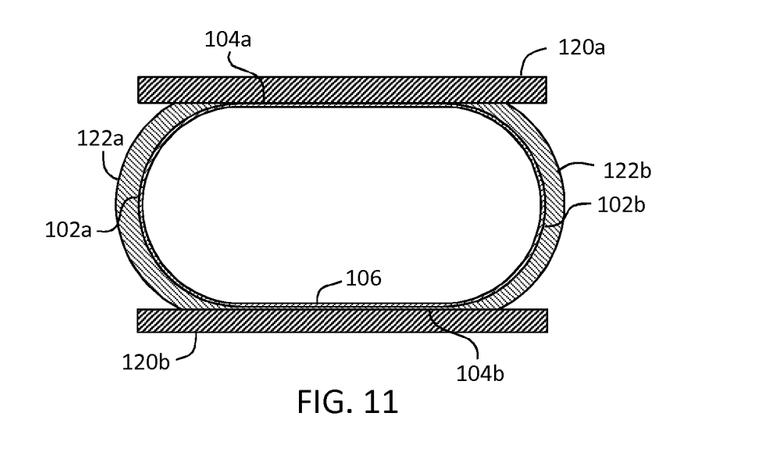
FIG. 11 is a cross sectional view of the delivery conduit of FIG. 10.
Figure 12:
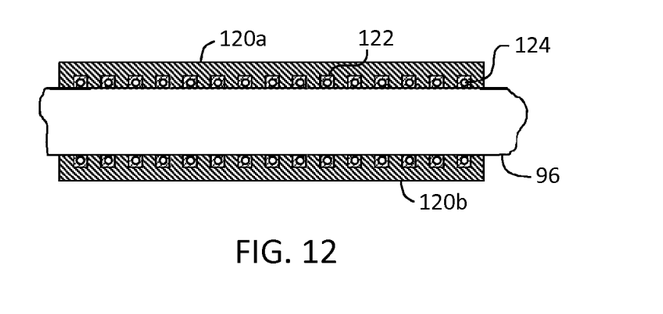
FIG. 12 is a longitudinal cross sectional view of the delivery conduit of FIG. 10.

To ensure controlled cooling of second delivery conduit 26, heating elements may be positioned adjacent at least portions of the conduit. For example, FIG. 10 illustrates second delivery conduit 26 comprising upper heating plates 120a and lower heating plates 120b. Second delivery conduit 26 may further comprise side heating plates 122a, 122b positioned adjacent side walls 102a and 102b, respectively. Upper and lower heating plates 120a, 120b, and side heating plates 122a and 122b are formed from a refractory insulating material and can comprise channels 122 through which electrical conductors (heating elements 124) are inserted. In the embodiment of FIGS. 10 and 11, upper and lower heating plates 120a and 120b are depicted as substantially flat plates, while side heating plates 122a, 122b are shown as being curved plates to match the curvature of the side walls of third portion 96. The heating elements are coupled to an electrical power source (not shown) so that an electrical current can flowed through the heating elements. The heat generated by the current flowing through the heating elements, in conjunction with the insulating plates, can be used to control the heat loss from the second delivery conduit and therefore the temperature of the molten glass as it passes through the second delivery conduit. In FIG. 10, a plurality of heating plates are depicted, arranged in zones, designated in Roman numerals as zones I-V, wherein the heating element or elements associated with each heating plate and/or zone can be individually controlled, thereby better facilitating control of the temperature of the molten glass flowing through second delivery conduit 26.

It should be understood that while the foregoing description was presented in in the context of a two-forming body apparatus for the production of laminated glass articles, the design and principals of operation can be applied to a single forming body apparatus for the production of a single layer glass ribbon. For example, a traditional fusion apparatus wherein only a single forming body having converging forming surfaces and from which only a single flow of molten glass flows therefrom may nevertheless benefit from an extended delivery conduit design as described herein when space constraints demand the delivery vessel be placed remotely from the forming body.

It will be apparent to those skilled in the art that various modifications and variations can be made to the embodiments disclosed herein without departing from the spirit and scope of the disclosure. Thus it is intended that the present disclosure cover the modifications and variations of such embodiments provided they come within the scope of the appended claims and their equivalents.

What is claimed is:

1. An apparatus for processing molten glass comprising:
   a first forming body;
   a first delivery vessel configured to supply molten glass to the first forming body through a first precious metal delivery conduit;
   a second forming body positioned vertically below the first forming body and comprising a trough;
   a second delivery vessel configured to supply molten glass to the second forming body, the second delivery vessel comprising an outlet conduit extending from a bottom thereof;
   a second precious metal conduit configured to receive a flow of molten glass from the second delivery vessel outlet conduit and deliver the flow of molten glass to the second forming body trough, comprising:
      a first portion having a straight longitudinal axis and a circular cross section, wherein at least a portion of the outlet conduit extends within but does not contact at least a length of the first portion, there being an annular gap separating the at least a portion of the outlet conduit from the first portion of the second precious metal conduit;
      a second portion configured to direct the flow of molten glass from a first direction to a second direction;
      a third portion having a straight longitudinal axis and an inside bottom surface, and wherein a cross sectional shape of the third portion is non-circular;
      a first transition portion that connects the second portion to the third portion;
      a second transition portion that couples the third portion to the second forming body trough, the second transition portion having an inside bottom surface; and
      wherein the bottom surfaces of the third portion and the second transition portions are no lower than a bottom surface of the trough.

2. The apparatus according to claim 1, wherein the second forming body comprises converging forming surfaces configured such that molten glass overflowing the trough flows over the converging forming surfaces.

3. The apparatus according to claim 1, further comprising a plurality of heating plates positioned adjacent to the delivery conduit and configured to be separately controlled, each heating plate comprising a refractory insulating material and a heating element arranged in a channel of the refractory insulating material.

4. The apparatus according to claim 1, wherein the third portion comprises a curved wall.

5. The apparatus according to claim 1, wherein the first forming body comprises parallel forming surfaces and a recessed bottom portion.

6. The apparatus according to claim 1, wherein a length of the first precious metal delivery conduit is less than a length of the second precious metal delivery conduit.

7. A method of processing molten glass comprising:
flowing a first molten glass to a first forming body from a first delivery vessel through a first delivery vessel outlet conduit;
flowing a second molten glass from a second delivery vessel to a trough of a second forming body from a second delivery vessel through a second delivery vessel outlet conduit, the first molten glass free-flowing from the first forming body and intersecting the second molten glass, the first molten glass forming a cladding layer on the second molten glass;
drawing the first molten glass and the second molten glass from the second forming body as a laminated glass ribbon;
wherein flowing the second molten glass from the second delivery vessel to the second forming body comprises flowing the second molten glass through a delivery conduit un-coupled from the second delivery vessel outlet conduit, the second delivery conduit comprising:
a first portion having a straight longitudinal axis and a circular cross section, wherein at least a portion of the delivery vessel outlet conduit extends within but does not contact at least a length of the first portion, there being an annular gap separating the at least a portion of the delivery vessel outlet conduit from the first portion of the delivery conduit;
a second portion configured to direct the flow of the second molten glass from a first direction to a second direction different from the first direction;
a third portion having a straight longitudinal axis and an inside bottom surface, and wherein a cross sectional shape of the third portion is non-circular;
a first transition portion that connects the second portion to the third portion;
a second transition portion that couples the third portion to the second forming body trough, the second transition portion having an inside bottom surface; and
wherein the bottom surfaces of the third portion and the second transition portion are no lower than a bottom surface of the trough.

8. The method according to claim 7, wherein the second forming body comprises converging forming surfaces configured such that molten glass overflowing the trough flows over the converging forming surfaces.

9. The method according to claim 7, wherein the third portion is sized such that a head loss for a molten glass having a density of 2.305 and a viscosity of 34,585 poise that flows through the third portion is no greater than 0.8 cm per cm of length of the third portion for a flow rate less than 100 kg/hour.

10. The method according to claim 7, further comprising heating the second delivery conduit using separately controlled heating elements.

11. The method according to claim 7, wherein the third portion comprises a curved wall.

12. The method according to claim 7, wherein the first forming body comprises parallel forming surfaces and a recessed bottom portion.

13. The method according to claim 7, wherein a length of the first precious metal delivery conduit is less than a length of the second precious metal delivery conduit.

14. The method according claim 7, wherein the first forming body comprises a recessed bottom portion.

* * * * *

UNITED STATES PATENT AND TRADEMARK OFFICE
CERTIFICATE OF CORRECTION

PATENT NO.         : 10,011,511 B2
APPLICATION NO.    : 14/912412
DATED              : July 3, 2018
INVENTOR(S)        : John Jerry Kersting Page 1 of 1

It is certified that error appears in the above-identified patent and that said Letters Patent is hereby corrected as shown below:

On the Title Page

Column 2, item (56), other publications, Line 1, delete "Supplementay" and insert
-- Supplementary --, therefor.

In the Claims

In Column 12, Line 38, Claim 14, delete "according" and insert -- according to --, therefor.

Signed and Sealed this
Seventeenth Day of December, 2019

Andrei Iancu
*Director of the United States Patent and Trademark Office*